(12) United States Patent
Ruiters et al.

(10) Patent No.: US 11,548,519 B2
(45) Date of Patent: Jan. 10, 2023

(54) CALIBRATING A DRIVE SYSTEM FOR AN AXLE OF A MOTOR VEHICLE

(71) Applicant: GKN Automotive Ltd., Redditch (GB)

(72) Inventors: Volker Rene Ruiters, Siegburg (DE); Andreas Langhanki, Duisburg (DE)

(73) Assignee: GKN Automotive Ltd., Birmingham (GB)

( * ) Notice: Subject to any disclaimer, the term of this patent is extended or adjusted under 35 U.S.C. 154(b) by 491 days.

(21) Appl. No.: 16/638,500

(22) PCT Filed: Aug. 16, 2017

(86) PCT No.: PCT/EP2017/070762
§ 371 (c)(1),
(2) Date: Feb. 12, 2020

(87) PCT Pub. No.: WO2019/034248
PCT Pub. Date: Feb. 21, 2019

(65) Prior Publication Data
US 2020/0269860 A1    Aug. 27, 2020

(51) Int. Cl.
*B60W 50/06*    (2006.01)
*B60W 10/02*    (2006.01)
*B60W 10/08*    (2006.01)

(52) U.S. Cl.
CPC .......... *B60W 50/06* (2013.01); *B60W 10/023* (2013.01); *B60W 10/08* (2013.01);
(Continued)

(58) Field of Classification Search
CPC .... B60W 50/06; B60W 10/023; B60W 10/08; B60W 2510/02; B60W 2510/081; B60W 2510/083; B60W 2510/085
(Continued)

(56) References Cited

U.S. PATENT DOCUMENTS

2005/0101432 A1* 5/2005 Pels .................... B60K 6/54
                                                      903/905
2012/0264565 A1* 10/2012 Kobayashi ............ B60L 50/16
                                                        477/5
(Continued)

FOREIGN PATENT DOCUMENTS

CN    1646920 A    7/2005
CN    1989361 A    6/2007
(Continued)

OTHER PUBLICATIONS

Notification of Reasons for Rejection dated Mar. 23, 2021 for Application No. JP2020-508626 (9 pages; with English translation).
(Continued)

*Primary Examiner* — Mahmoud S Ismail
(74) *Attorney, Agent, or Firm* — Bejin Bieneman PLC

(57) ABSTRACT

The disclosure relates to a method for calibrating a drive system for an axle of a motor vehicle; wherein the drive system includes at least one electric machine as the drive unit, a drive shaft driven by the drive unit, a first output shaft and a second output shaft, as well as a first clutch connecting the drive shaft to the first output shaft and a second clutch connecting the drive shaft to the second output shaft.

14 Claims, 2 Drawing Sheets

(52) U.S. Cl.
CPC ... *B60W 2510/02* (2013.01); *B60W 2510/081* (2013.01); *B60W 2510/083* (2013.01); *B60W 2510/085* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2013/0053214 | A1* | 2/2013 | Kawai | B60K 6/547 903/902 |
| 2014/0371029 | A1* | 12/2014 | Kobayashi | B60W 10/02 180/65.265 |
| 2019/0084576 | A1* | 3/2019 | Teslak | F16D 67/02 |

FOREIGN PATENT DOCUMENTS

| | | |
|---|---|---|
| CN | 101793296 A | 8/2010 |
| CN | 102162521 A | 8/2011 |
| CN | 102407774 A | 4/2012 |
| CN | 104350310 A | 2/2015 |
| CN | 104819222 A | 8/2015 |
| CN | 104976243 A | 10/2015 |
| CN | 106574672 A | 4/2017 |
| DE | 10 2006 029741 A1 | 5/2007 |
| DE | 112012001771 A5 | 1/2014 |
| EP | 1253341 A2 | 10/2002 |
| JP | H07-47851 A | 2/1995 |
| JP | H09-136555 A | 5/1997 |
| JP | H11-165559 A | 6/1999 |
| JP | 2001263385 A | 9/2001 |
| JP | 2003278806 A | 10/2003 |
| WO | 2015173621 A2 | 11/2015 |
| WO | 2016177441 A1 | 11/2016 |

OTHER PUBLICATIONS

International Search Report and Written Opinion for PCT/EP2017/070762 dated Jun. 5, 2018 (9 pages; with English translation).
Chinese Office Action for CN 201780095991.8 dated Dec. 31, 2020 (13 pages; with English translation).

* cited by examiner

CALIBRATING A DRIVE SYSTEM FOR AN AXLE OF A MOTOR VEHICLE

CROSS-REFERENCE TO RELATED APPLICATIONS

This application is a national stage of, and claims priority to, Patent Cooperation Treaty Application No. PCT/EP2017/070762, filed on Aug. 16, 2017, which application is hereby incorporated herein by reference in its entirety.

BACKGROUND

The present disclosure relates to a method for calibrating a drive system for an axle of a motor vehicle. The drive system includes at least one electric machine as the drive unit, a drive shaft driven by the drive unit, a first output shaft and a second output shaft, as well as a first clutch connecting the drive shaft to the first output shaft and a second clutch connecting the drive shaft to the second output shaft. Moreover, a control unit is provided to regulate the drive unit and the clutches as well as to determine rotational speeds of the drive shaft and the output shafts. The clutches are associated with the output shafts of a common axle.

Such drive systems are designed e.g. to channel a torque provided by the drive unit and apportion it as needed. The clutches used are customarily calibrated prior to the first operational use in the course of an end-of-line testing, so that a control unit can operate the clutches according to each operating point. However, the condition or the (optimal) operating point of the clutches may change over the course of the operating time, e.g., due to wear. Hence, the originally required actuating pressures of the clutches for the transmittal of a torque, which continue to be applied, after a certain operating time may no longer channel or apportion the torque as calculated by the control unit or no longer do so according to the desired parameters. A new calibrating of the clutches, for example during a servicing procedure, is then required. But such a servicing procedure is undesirable, because it involves inconvenience for the user of the vehicle.

Hence, the problem which the present disclosure proposes to solve is to solve at least in part the aforementioned drawbacks and problems and in particular to propose a suitable method for (subsequent) calibrating of a drive system (during its operation). The method should make it possible to apply a correct actuating pressure to the clutches primarily in dependence on a first torque provided by the drive unit or even at any time during an operation of the drive system. This should make possible the fastest and most accurate transmission and apportionment of the first torque on the wheels of an axle via the clutches during the service life.

SUMMARY

For this, a method is proposed according to the features of claim 1. Advantageous modifications are the subject matter of the dependent claims. The features individually mentioned in the claims may be combined with each other in technologically meaningful manner and may be supplemented with explanatory situations from the specification and details from the figures, thereby indicating further variant embodiments of the disclosure.

A method is proposed for calibrating a drive system for an axle of a motor vehicle. The drive system can include at least one electric machine as the drive unit,
a drive shaft driven by the drive unit,
a first output shaft and a second output shaft,
a first clutch connecting the drive shaft to the first output shaft,
a second clutch connecting the drive shaft to the second output shaft, and
a control unit to regulate the drive unit and the clutches as well as to determine rotational speeds of the drive shaft and the output shafts.

The method involves at least the following steps:
a) providing a first torque at the drive unit for an operating point, wherein an unequal apportionment of the torques on the output shafts should occur in particular at the operating point;
b) determining a first actuating pressure for the first clutch, determining a second actuating pressure (different from the first actuating pressure) for the second clutch from a first characteristic diagram and applying the (first and second) actuating pressures for the transmitting and apportioning of the first torque to the (first and second) output shafts depending on the operating point (possibly taking into account a transmission ratio between the drive unit and the output shafts);
c) determining a first actual differential rotational speed between the first output shaft and the drive shaft and a second actual differential rotational speed between the second output shaft and the drive shaft;
d) either: adjusting a first calibrated actuating pressure for the first clutch until a first target differential rotational speed is achieved and adjusting a second calibrated actuating pressure for the second clutch until a second target differential rotational speed is achieved, or: adjusting a first calibrated torque at the drive unit until a first target differential rotational speed on the first clutch and a second target differential rotational speed on the second clutch is achieved;
e) creating a second characteristic diagram taking into account the (first and second) calibrated actuating pressures or the first calibrated torque at the drive unit, wherein either the higher value of the (first/second) actuating pressures is at first changed or both (first and second) actuating pressures are changed at the same time in a weighting dependent on their value.

The above (not definitive) dividing of the steps of the method into a) to e) is meant primarily to serve only for their distinction and does not necessitate any sequence and/or dependency. The frequency of the steps of the method may also vary, e.g., during the adjusting and/or operation of the drive system. Likewise, it is possible for the steps of the method to be at least partly overlapping each other in time and/or for one or more steps of the method to be repeated.

The method for calibrating relates in particular to the regulating of the clutches of the drive system, so that these are checked or operated at predetermined time points or even at any time by a calibrated actuating pressure and a first torque provided by the drive unit can thereby be transmitted in desired manner to the wheels of a common axle of the motor vehicle.

In particular, the method is intended for the regulating of a drive system in which two clutches are provided on a common axle of the motor vehicle, and one wheel of the motor vehicle is connected respectively in torque transmitting manner to the drive unit of the motor vehicle by each of the two clutches. The two clutches may replace the otherwise customary differential by which different rotational speeds of the wheels can be equalized.

The design of such clutches and drive systems may be described as follows. Multi-plate clutches may be used as the clutches, for example, in which outer plates with an outer plate carrier and inner plates with an inner plate carrier are connected in rotationally fixed manner and each plate carrier is connected in rotationally fixed manner to the drive shaft or the respective output shaft. When subjected to a closing force acting in an axial direction (due to the actuating pressure), the plates or in other clutches the mating frictional elements are brought into contact with each other, so that a torque can be transmitted from the drive shaft across the clutch to the respective output shaft.

Prior to a first use of the drive system, the actuating pressure of the respective clutch required for the transmittal of a first torque to the drive unit might not be known. Moreover, in the course of the operation of the drive system, for example, the actuating pressure of the clutch required for the transmittal of the first torque (and/or the torque apportioned among the first clutch and second clutch) may change. In particular, the actuating pressure and/or also its change for the first clutch and the second clutch may be different.

A "calibrating" here involves in particular a reliably reproducible determination and documentation of the deviation of the desired and actually transmitted torques. As a further process, a correction may be included in the subsequent use of the drive system taking into account the deviation so determined. This may further result in an integrated comparison and/or adjustment of the regulation of the drive unit, for example if the deviation so determined is unacceptably large. After each adjustment, a repeat checking of the regulation of the drive unit may occur, in order to verify the changes made.

Now, with the method proposed here, a calibrating of the actuating pressure is also possible during the operation of the drive system. For this, (only) a first torque is provided by the drive unit and this is transmitted and possibly apportioned among the wheels on the basis of an existing operating point (which is defined, e.g., by demand of a driver of the motor vehicle).

In the course of step a), a first torque is provided at the drive unit for a predetermined operating point. This may be generated by the drive unit, e.g., based on a demand of a driver of the motor vehicle, e.g., by operating a pedal.

The operating point may be predetermined such that an unequal distribution of the torques on the output shafts will occur.

At the operating point, where both clutches are transmitting the same torque, yet a desired total torque is not correct, it may likewise be advisable to correct both clutches in the same way, as explained below, until the total torque is right. The average error can also be reduced in this case, even if the distribution of the torques among the two clutches is not necessarily significantly improved.

In step b), a first actuating pressure for the first clutch and a second actuating pressure for the second clutch are determined from a first characteristic diagram. The two actuating pressures should bring about the transmitting and apportioning of the first torque among the two output shafts depending on the operating point (possibly taking into account a transmission ratio between the drive unit and the output shafts). The first torque may also be divided up in unequal portions, e.g., based on different traction conditions on the wheels, when negotiating a curve, and/or when using an active ride control ("torque control"), in which torques can be apportioned substantially freely among the wheels depending on a desired ride behavior (understeering, oversteering, neutral).

In particular, a first target torque should be transmitted across the first clutch and a second target torque should be transmitted across the second clutch, whereby the target torques in total correspond to the first torque provided by the drive unit, especially taking into account a transmission ratio between the drive unit and the output shafts.

Thus, actuating pressures specified for different operating points and first torques can be predetermined and saved in the first characteristic diagram, which are to be applied to the clutches for the transmittal and possible apportioning of the first torque.

Deviations in the desired or predetermined applying of the actuating pressures may occur in the two clutches, for example due to wear and/or a calibrating not having been done yet during the first use of the drive system. These deviations are manifested by ascertainable actual differential rotational speeds.

In step c), a first actual differential rotational speed between the first output shaft and the drive shaft and a second actual differential rotational speed between the second output shaft and the drive shaft are ascertained.

These actual differential rotational speeds (including zero values) enable an inference as to the adjusted and actually applied actuating pressures of the clutches. When the actuating pressure is too high, the actual differential rotational speed is 0 revolutions per minute. When the actuating pressure is too low, the actual differential rotational speed is not equal to 0 revolutions per minute and in particular it is lower than a predetermined target differential rotational speed. When the actuating pressure is too low, the drive shaft rotational speed is higher than the first or second rotational speed of the respective output shaft.

When the actuating pressure is too low, frictional heat may be generated in the clutch due to the slippage between the at least one output shaft and the drive shaft. This may result at least in a damaging of the clutch. When the actuating pressure is too high, it cannot be assured that the torque provided by the drive unit is being transmitted as desired and apportioned among the output shafts.

The actual differential rotational speeds as well as the rotational speeds of the drive unit may be ascertained by means of the control unit. This can ascertain the drive shaft rotational speed and the rotational speeds of the output shafts e.g. through rotational speed sensors.

In particular, a target differential rotational speed is dictated between the two output shafts and the drive shaft. This so-called micro-slip at the respective clutches makes it possible to determine exactly the torque being transmitted across the two clutches in total. A determination of the torque transmitted across each individual clutch, i.e., the actual distribution of the first torque, cannot be done. In particular, the target differential rotational speed is dependent on the operating point and is present or it is adjusted at constant drive shaft rotational speed and constant rotational speed of the output shafts.

During step d), the following process d1) can be carried out: adjusting a first calibrated actuating pressure for the first clutch until a first target differential rotational speed is achieved and adjusting a second calibrated actuating pressure for the second clutch until a second target differential rotational speed is achieved.

During step d), the following process d2) can be carried out: adjusting a first calibrated torque at the drive unit until a first target differential rotational speed on the first clutch and a second target differential rotational speed on the second clutch is achieved.

Processes d1) and d2) may be carried out alternatively.

The actuating pressures or the first torque on the drive unit are regulated up or down—assuming an undesirable deviation exists—based on the actual differential rotational speed ascertained in step c) and applied to the clutch until a predetermined target differential rotational speed is present at the respective clutch.

Steps c) and d) may be carried out in iteration until a predetermined target differential rotational speed is present at the respective clutch.

In step e), a second characteristic diagram is created, taking into account the calibrated actuating pressures or the first calibrated torque at the drive unit from step d). When creating the second characteristic diagram either the higher value of the actuating pressures is at first changed (i.e., that of the first actuating pressure and the second actuating pressure) or both actuating pressures are changed at the same time, namely, in a weighting dependent on their value.

In particular, a proportional changing of the actuating pressures is therefore not undertaken here, but rather only if the operating point in step a) requires an equal distribution of the first torque among the clutches.

The creation of the new characteristic diagram can be done by calculation, meaning in particular the calculation of a correction vector/characteristic diagram and/or the continuous multiplication of the previous characteristic diagram with an ascertained correction vector is recorded. The creation of the new characteristic diagram may be done in such a way that an already stored characteristic diagram is selected and/or activated in dependence on the ascertained deviation. The second characteristic diagram in particular replaces the first characteristic diagram, so that the second characteristic diagram may be retrieved during a subsequent operation of the drive system, even when carrying out steps a) and b). The calibrated actuating pressures from the second characteristic diagram thus replace the actuating pressures from the first characteristic diagram.

In particular, in a further step f) the first characteristic diagram can be replaced by the second characteristic diagram, so that a new first characteristic diagram is present.

In particular, the first torque being transmitted can be determined at least from the electric motor current present on the electric machine.

The first actuating pressure applied in step b) may correspond to a first torque theoretically transmissible at the first clutch and the second actuating pressure may correspond to a second torque theoretically transmissible at the second clutch.

A deviation between a total target torque (the sum of the first and second target torque) transmitted jointly by both clutches and a theoretically transmissible total torque (the sum of the first and second theoretically transmissible torque) can be established by step c). This deviation can be corrected by an adjusting of the calibrated actuating pressures or the calibrated first torque on the drive axle per step d). This deviation is taken into account when creating the second characteristic diagram.

The theoretically transmissible torque is in particular a torque coordinated with the applied operating pressure according to the existing characteristic diagram.

The operating pressures applied in step b), being possibly too high or too low, correspond to a first theoretically transmissible torque on the first clutch (for example, one which is at first higher or lower than a first target torque which should actually be transmitted) and a second theoretically transmissible torque on the second clutch (for example, one which is at first higher or lower than a second target torque which should actually be transmitted). The total of the theoretically transmissible torques may accordingly have a deviation from the first torque provided by the drive unit (and thus a deviation from a total of the first target torque and the second target torque). This deviation may be determined in step c) with the aid of the differential rotational speeds and is now corrected and/or determined in its magnitude by a calibrating per step d) (e.g., by iteration).

The characteristic diagram in step e) can be created or modified in dependence on the deviation of the total provided or theoretical torque.

The proposed method is based in particular on the fact that the major portion of the error or the deviation of the total torque occurs in the clutch with the stronger actuation (i.e., the clutch with the higher actuating pressure). In particular, it is thus proposed to adapt the actuating pressure of this clutch stored in the characteristic diagram at first (and by itself) or (if both actuating pressures are being changed) more strongly than the actuating pressure of the less actuated clutch. This adjusting of the first characteristic diagram can generally be done by means of correction factors, especially for specific operating points by means of correction vectors or correction characteristic diagrams or by creating a new characteristic diagram.

In each subsequent actuation or in each subsequent performance of the method, it can be ascertained once more whether a deviation of the total of the theoretically transmissible torques from the (then applied) first torque is present. This can be verified each time in step c) by determining the differential rotational speeds.

At least one of the two clutches and preferably both clutches can be hydraulically operated. In a hydraulically operated clutch, the actuating pressure is transmitted via a hydraulic fluid to the clutch. The hydraulic fluid can be pressurized by a pump (also electrically operated).

At least one of the two clutches and preferably both clutches can be electrically operated. In an electrically operated clutch, the actuating pressure is generated directly by an electric machine, e.g., by a ramp assembly rotated by the machine.

In particular, at least an electrical motor current and a motor rotational speed of the drive unit are detected by means of the control unit. The motor rotational speed of the drive unit can be determined through the drive shaft rotational speed of the drive shaft or vice versa.

In particular, steps a) to e) can be carried out continuously. This means, in particular, that each time when steps a) to d) are carried out, step e) is also carried out. Thus, in particular, continuously means that step e) is always initiated at predetermined operating points or driving situations.

The steps a) to e) can be carried out periodically (at predetermined time points). That is, in particular, steps a) to d) are carried out several times in succession, without initiating at least step e). In particular, a period is determined in dependence on at least one of the following parameters: the time, the operating duration of the drive system, the more or less intensive strain on the drive system. A period may include one or more days or between 10 hours and 100 hours operating duration. The period may vary in particular in dependence on the strain on the drive system.

In particular, each time one wheel of the common axle of the motor vehicle can be connected in torque transmitting manner to the drive unit by the actuating of each of the clutches.

Preferably, at least one clutch and especially both clutches are a multi-plate clutch.

A transmission with a variable transmission ratio can be arranged between the drive unit and the output shafts. Variable transmission ratio means in particular that a single constant transmission ratio does not exist, but rather the transmission ratio can be changed, e.g., in stages or also continuously.

Alternatively, no transmission is arranged between the drive unit and the output shafts, or a transmission with a single fixed transmission ratio can be used.

The properties, the design, and/or the mode of functioning of the particular transmission should be taken into account in the method as described above.

Moreover, a motor vehicle is proposed, comprising at least one drive system for at least one axle of the motor vehicle. The drive system can include at least
- one electric machine as the drive unit,
- one drive shaft driven by the drive unit,
- a first output shaft and a second output shaft, and
- a first clutch connecting the drive shaft to the first output shaft and
- a second clutch connecting the drive shaft to the second output shaft, and moreover
- a control unit to regulate the drive unit and the clutches as well as to determine rotational speeds of the drive shaft and the output shafts, wherein the drive system is adapted and designed to be operated with the proposed method.

In particular, the two clutches for the transmittal of torques are arranged on an axle of a motor vehicle, so that by the activating of the first clutch a first wheel of an axle and by the activating of the second clutch a second wheel of the same axle of the motor vehicle is connected in torque-transmitting manner to the drive unit. The clutches in particular are therefore not a clutch of a motor vehicle that is arranged between the drive unit and a shiftable transmission of the motor vehicle. Such clutches, arranged in common on an axle, must (often) handle abrupt changes in a first torque and transfer this in predetermined manner to the wheels. Therefore, a constant or periodic adapting of the characteristic diagram during the operation of the motor vehicle (and not only during a servicing procedure or during first use) is especially advantageous.

It should be noted, for precautionary reasons, that the ordinals used here ("first", "second", etc.) serve primarily (only) to distinguish several similar objects, magnitudes, or processes, i.e., in particular they do not necessarily indicate any dependence and/or sequence of these objects, magnitudes, or processes among each other.|[PK1]

BRIEF DESCRIPTION OF THE FIGURES

The disclosure as well as the technical setting shall be explained more closely below with the aid of the figures. It should be pointed out that the disclosure is not intended to be confined to the exemplary embodiments shown. In particular, unless otherwise explicitly mentioned, partial aspects of the situations explained in the figures may also be extracted and combined with other components and disclosures from the present specification and/or figures. The same reference numbers designate the same objects, so that any explanations from other figures may be borrowed in addition.

DETAILED DESCRIPTION

Figure 1:
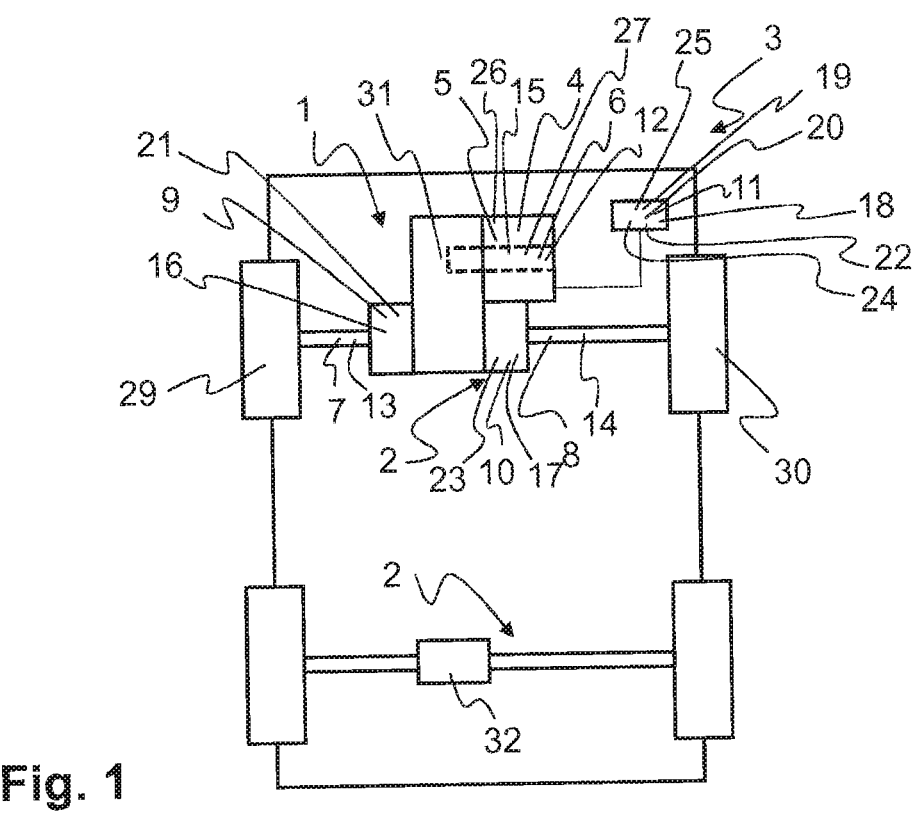
FIG. 1: a motor vehicle with a drive system for driving a respective wheel of the motor vehicle.

FIG. 1 shows a motor vehicle 3 with a drive system 1 for driving respectively a first wheel 29 and a second wheel 30 of a common axle 2 of the motor vehicle 3. The drive system 1 includes an electric machine 4 as the drive unit 5, a drive shaft 6 driven by the drive unit 5, a first output shaft 7 and a second output shaft 8, as well as a first clutch 9 connecting the drive shaft 6 to the first output shaft 7 and a second clutch 10 connecting the drive shaft 6 to the second output shaft 8. Moreover a control unit 11 is provided to regulate the drive unit 1 and the two clutches 9, 10 as well as to determine rotational speeds 12, 13, 14 of the drive shaft 6 and the two output shafts 7, 8.

A drive system 1 is shown here in which two clutches 9, 10 are provided on a common axle 2 of the motor vehicle 3, and one wheel 29, 30 of the motor vehicle 3 is connected respectively in torque transmitting manner to the drive unit 5 of the motor vehicle 3 by each of the two clutches 9, 10. The two clutches 9, 10 replace an otherwise customary differential 32 (shown here on the other axle of the motor vehicle) by which different rotational speeds of the wheels can be equalized.

A transmission 31 with a variable transmission ratio is arranged between the drive unit 5 and the output shafts 7, 8.

The method for calibrating involves the regulating of the clutches 9, 10 of the drive system 1 so that they can be activated at any time by a calibrated actuating pressure 21, 23. In this way, a first torque 15 provided by the drive unit 5 can be transmitted in desired manner (and apportioned) on the wheels 29, 30 of a common axle 2 of the motor vehicle 3.

With the method proposed here, a calibrating of the actuating pressure 16, 17, 21, 23 is also possible during the operation of the drive system 1. For this, a first torque 15 is provided by the drive unit 5 and this is transmitted (proportionately) among the wheels 29, 30 on the basis of an existing operating point (which is defined, e.g., by a demand of a driver of the motor vehicle 3).

In the course of step a), a first torque 15 is provided at the drive unit 5. This may be generated by the drive unit, e.g., based on a demand of a driver of the motor vehicle 3.

In step b), a first actuating pressure 16 for the first clutch 9 and a second actuating pressure 17 for the second clutch 10 are determined in the control unit 11 from a first characteristic diagram 18. The actuating pressures 16, 17 should bring about a transmitting and apportioning of the first torque 15 among the output shafts 7, 8 depending on the operating point. The first torque 15 may also be apportioned differently here. Different actuating pressures 16, 17 may be stored in the first characteristic diagram 18 for different operating points and first torques 15, which are to be applied to the clutches 9, 10 for the transmittal and possible apportioning of the first torque 15.

In step c), a first actual differential rotational speed 19 between the first output shaft 7 and the drive shaft 6 and a second actual differential rotational speed 20 between the second output shaft 8 and the drive shaft 6 are ascertained. These actual differential rotational speeds 19, 20 enable an inference as to the adjusted and actually applied actuating pressures of the clutches 9, 10. When the actuating pressure is too high, the actual differential rotational speed 19, 20 is zero revolutions per minute. When the actuating pressure is too low, the actual differential rotational speed 19, 20 is not equal to zero revolutions per minute and in particular it is lower than a predetermined target differential rotational speed 22, 24. In this case, the drive shaft rotational speed 12 is higher than the first rotational speed 13 or second rotational speed 14 of the respective output shaft 7, 8.

The actual differential rotational speeds 19, 20 as well as the rotational speed of the drive unit 5 are ascertained through the control unit 11. This can ascertain the drive shaft rotational speed 12 and the rotational speeds 13, 14 of the output shafts 7, 8 through rotational speed sensors.

A target differential rotational speed 22, 24 is dictated between the output shafts 7, 8 and the drive shaft 6. This so-called micro-slip at the respective clutches 9, 10 makes it possible to determine exactly the torque being transmitted across the clutches 9, 10 in total. But no inference is possible as to the actual distribution of the first torque 15 among the clutches 9, 10. This target differential rotational speed 22, 24 is dependent in particular on the operating point and is present at constant drive shaft rotational speed 12 and constant rotational speed 13, 14 of the output shafts 7, 8.

The operating pressures 16, 17 applied, being too high or too low, correspond to a first theoretically transmissible torque 35 on the first clutch 9 (according to a first characteristic diagram 18) and a second theoretically transmissible torque 36 on the second clutch 10 (according to a first characteristic diagram 18). The total of the theoretically transmissible torques 39 may accordingly have a deviation from the first torque 15 provided by the drive unit 5. This deviation may now be corrected by a calibrating per step d).

In step d), a first calibrated actuating pressure 21 can be adjusted for the first clutch 9 until a first target differential rotational speed 22 is achieved and a second calibrated actuating pressure 23 can be adjusted for the second clutch 10 until a second target differential rotational speed 24 is achieved. In step d)—possibly alternatively—a first calibrated torque can be adjusted at the drive unit 5 until the first target differential rotational speed 22 and the second target differential rotational speed 24 is achieved.

The actuating pressure is thus regulated up or down, taking into account the actual differential rotational speed 19, 20 ascertained in step c), and applied to the clutch 9, 10 until a predetermined target differential rotational speed 22, 24 is present at the respective clutch 9, 10.

In step e), a second characteristic diagram 25 is created, taking into account the calibrated actuating pressures 21, 23 or the first calibrated torque at the drive unit 5. The second characteristic diagram 25 in particular replaces the first characteristic diagram 18, so that the second characteristic diagram 25 may be retrieved during a subsequent operation of the drive system 1, even when carrying out steps a) and b). The corrected actuating pressures from the newly created or second characteristic diagram 25 thus replace the actuating pressures 16, 17 from the first characteristic diagram 18.

In a further step f), the first characteristic diagram 18 can be replaced by the second characteristic diagram 25, so that a new first characteristic diagram 18 is present.

The second characteristic diagram 25 can be easily created, for example, by multiplying first correction factors 40 for the first clutch 9 and second correction factors 41 for the second clutch 10 with the first characteristic diagram 18.

The first torque 15 to be transmitted can be determined at least from the electric motor current 26 present at the electric machine 4.

At least one electrical motor current 26 and one motor rotational speed 27 of the drive unit 5 are detected via the control unit 11. The motor rotational speed 27 of the drive unit 5 can be ascertained through the drive shaft rotational speed 12 of the drive shaft 6 or vice versa.

Figure 2:
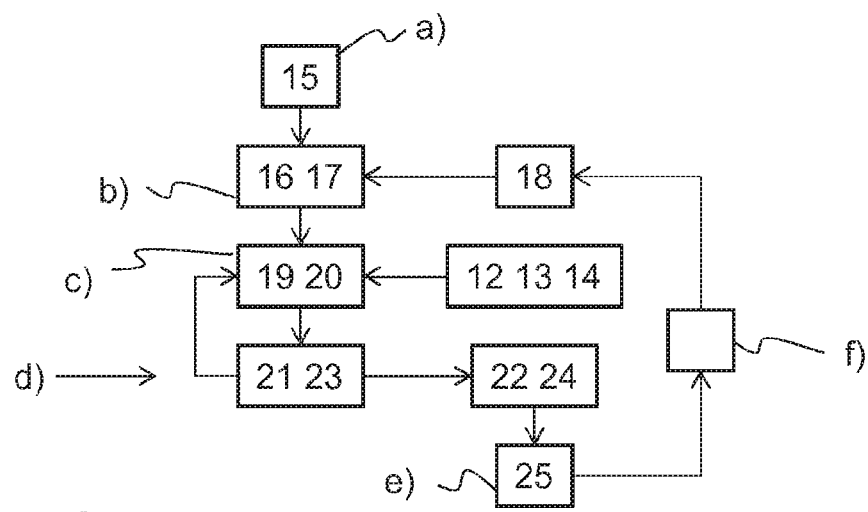
FIG. 2: a flow chart of a method for calibrating a drive system.

FIG. 2 shows a flow chart of the method. Reference is made to the remarks for FIG. 1. In the course of step a), a first torque 15 is provided at the drive unit 5.

In step b), a first actuating pressure 16 for the first clutch 9 and a second actuating pressure 17 for the second clutch 10 are determined in the control unit 11 from a first characteristic diagram 18.

In step c), a first actual differential rotational speed 19 between the first rotational speed 13 of the first output shaft 7 and the drive shaft rotational speed 12 of the drive shaft 6 and a second actual differential rotational speed 20 between the second rotational speed 14 of the second output shaft 8 and the drive shaft rotational speed 12 of the drive shaft 6 are ascertained.

A target differential rotational speed 22, 24 is dictated between the output shafts 7, 8 and the drive shaft 6. Optionally, in step d) a first calibrated actuating pressure 21 can be adjusted for the first clutch 9 until a first target differential rotational speed 22 is achieved and a second calibrated actuating pressure 23 can be adjusted for the second clutch 10 until a second target differential rotational speed 24 is achieved. In step d)—possibly alternatively—a first calibrated torque can be adjusted at the drive unit 5 until the first target differential rotational speed 22 and the second target differential rotational speed 24 is achieved.

The actuating pressure is regulated up or down, taking into account the actual differential rotational speed 19, 20 ascertained in step c), and applied to the clutch 9, 10 until a predetermined target differential rotational speed 22, 24 is present at the respective clutch 9, 10.

In step e), a second characteristic diagram 25 is created, taking into account the calibrated actuating pressures 21, 23 or the first calibrated torque at the drive unit 5. In a further step f), the first characteristic diagram 18 can be replaced by the second characteristic diagram 25, so that a new first characteristic diagram 18 is present.

Figure 3:
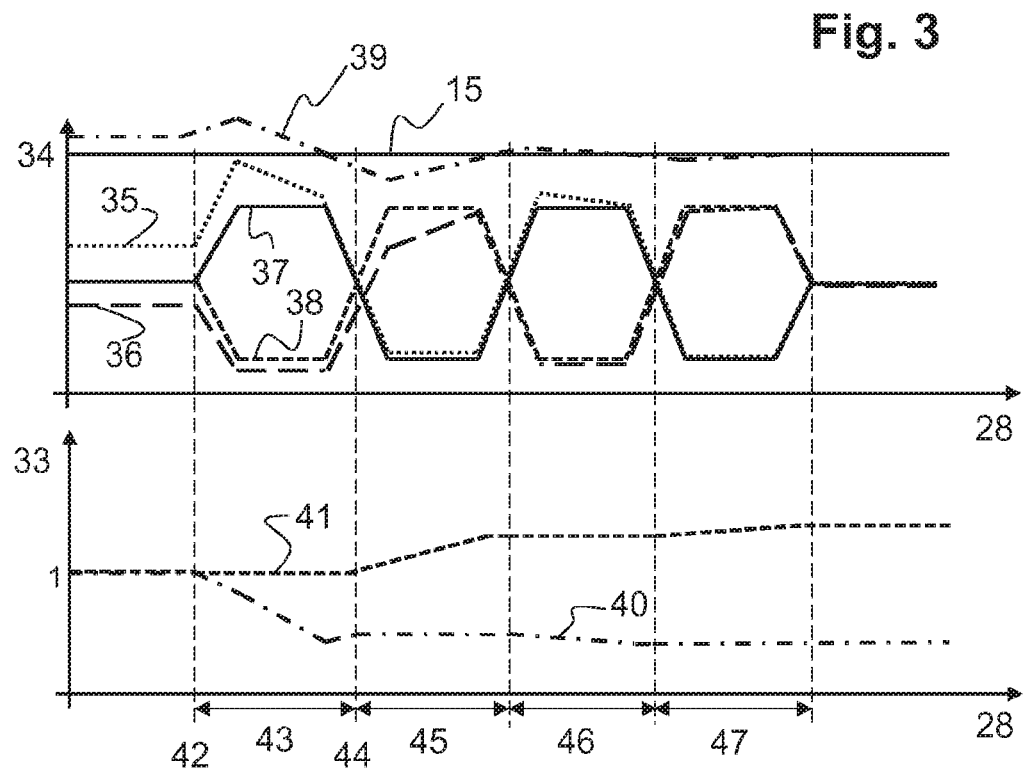
FIG. 3: a representation of the torques as a function of time during a method for calibrating a drive system.

FIG. 3 shows a representation of the torques 34 as a function of time 28 and the correction factors 33 during the method. Reference is made to the remarks for FIGS. 1 and 2.

In the course of step a), a first torque 15 is provided at the drive unit 5.

In step b), a first actuating pressure 16 for the first clutch 9 and a second actuating pressure 17 for the second clutch 10 are determined in the control unit 11 from a first characteristic diagram 18.

The operating pressures 16, 17 applied, being possibly too high or too low, correspond to a first theoretically transmissible torque 35 on the first clutch 9 (being at first higher than a first target torque 37 which should actually be transmitted) and a second theoretically transmissible torque 36 on the second clutch 10 (being at first lower than a second target torque 38 which should actually be transmitted).

The total of the theoretically transmissible torques 39 may accordingly have a deviation from the total target torque. This deviation may be identified by calibrating the actuating pressures or the drive torque per step d). In step e), a new first/second actuating pressure 16, 17 for step b) can be determined by creating a second characteristic diagram 25 (here in very simple form by multiplication of the first characteristic diagram 18 with the correction factor 40 for the first clutch 9 and the correction factor 41 for the second clutch 10). The correction factors 40, 41 are determined by iteration in the course of step e), as shown, in order to obtain an adapted or second characteristic diagram 25.

Step e) in this example commences as soon as the first torque 15 is to be transmitted to differing degrees across the first clutch 9 and the second clutch 10 (first time point 42). By adjusting the target differential rotational speeds 22, 24 according to steps a) to d), it is determined that the total of the theoretically transmitted torque 39 (across both clutches 9, 10 jointly) deviates from the total target torque to be transmitted. In step e), the characteristic diagram is adapted in the first interval 43 solely for the more strongly actuated clutch, so that the curve of the theoretically transmissible torque comes closer to the curve of the target torque.

In a renewed actuating of the clutches 9, 10, the method can be carried out again (second time point 44). The correction factor for the characteristic diagram of only the now more strongly actuated other clutch 10, 9 is altered here, whereupon the curve of the theoretically transmissible second torque 36 comes closer to the curve of the second target torque 38 in the second interval 45.

The method can be carried out in further intervals (third interval 46, fourth interval 47) as described above for the first two intervals 43, 45, until a deviation of the total of the theoretically transmissible torques 39 from the first torque 15 is no longer present, or until it drops below a limit value (i.e., the actual differential rotational speeds 13, 14 no longer need to be corrected).

The first correction factor 40 in this example corresponds to the ratio (quotient) of the first target torque 37 and the theoretically transmissible first torque 35. The second correction factor 41 corresponds to the ratio (quotient) of the second target torque 38 and the theoretically transmissible second torque 36.

LIST OF REFERENCE NUMBERS

1 Drive system
2 Axle
3 Motor vehicle
4 Machine
5 Drive unit
6 Drive shaft
7 First output shaft
8 Second output shaft
9 First clutch
10 Second clutch
11 Control unit
12 Drive shaft rotational speed
13 First rotational speed
14 Second rotational speed
15 First torque
16 First actuating pressure
17 Second actuating pressure
18 First characteristic diagram
19 First actual differential rotational speed
20 Second actual differential rotational speed
21 First calibrated actuating pressure
22 First target differential rotational speed
23 Second calibrated actuating pressure
24 Second target differential rotational speed
25 Second characteristic diagram
26 Motor current
27 Motor rotational speed
28 Time
29 First wheel
30 Second wheel
31 Transmission
32 Differential
33 Correction factor
34 Torque
35 Theoretically transmissible first torque
36 Theoretically transmissible second torque
37 First target torque
38 Second target torque
39 Total of the theoretically transmissible torques
40 First correction factor
41 Second correction factor
42 First time point
43 First interval
44 Second time point
45 Second interval
46 Third interval
47 Fourth interval

The invention claimed is:

1. A system, comprising a computer including a processor and a memory, the memory storing instructions executable by the processor to:
   a) provide a first torque at a drive unit for a first operating point;
   b) determine a first actuating pressure for a first clutch and a second actuating pressure for a second clutch from a first characteristic diagram and to apply the first and second actuating pressures to first and second output shafts to transmit the first torque based on the first operating point;
   c) determine a first actual differential rotational speed between a rotational speed of the first output shaft and a rotational speed of a drive shaft and a second actual differential rotational speed between a rotational speed of the second output shaft and the rotational speed of the drive shaft;
   d) one of:
      (1) adjust a first calibrated actuating pressure for the first clutch until reaching a first target differential rotational speed and to adjust a second calibrated actuating pressure for the second clutch until reaching a second target differential rotational speed, or (2) adjust a first calibrated torque at the drive unit until achieving a first target differential rotational speed on the first clutch and a second target differential rotational speed on the second clutch; and
   e) generate a second characteristic diagram based on the calibrated actuating pressures or the first calibrated torque at the drive unit, wherein either the higher value of the actuating pressures is at first changed or both actuating pressures are changed at the same time in a weighting based on their value.

2. The system of claim 1, wherein the first actuating pressure corresponds to a first clutch torque transmissible at the first clutch and the second actuating pressure corresponds to a second clutch torque transmissible at the second clutch, and the instructions further include instructions to:
   identify a deviation between a total target torque transmitted jointly by the first and second clutches and a transmissible total torque;
   adjust the calibrated actuating pressures or the calibrated first torque on the drive axle to correct the deviation; and
   generate a second characteristic diagram based on the deviation.

3. The system of claim 1, wherein at least the first clutch or the second clutch is one of a hydraulically or electrically operated clutch.

4. The system of claim 1, wherein the instructions further include instructions to detect, with the control unit, an electrical motor current and a motor rotational speed of the drive unit.

5. The system of claim 1, wherein the instructions further include instructions to carry out instruction e) each time instructions a) to d) are carried out.

6. The system of claim 1, wherein the instructions a) to e) are carried out at predetermined periods of time.

7. The system of claim 6, wherein the predetermined periods of time are determined based on at least one of the following parameters: a current time, an operating duration of a drive system, or a strain on the drive system.

8. The system of claim 1, wherein the instructions further include instructions to actuate each clutch to connect one wheel of a common axle of a motor vehicle in a torque transmitting manner.

9. The system of claim 1, wherein a transmission with a variable transmission ratio is arranged between the drive unit and the output shafts.

10. A method, comprising:
   a) providing a first torque at a drive unit for a first operating point;
   b) determining a first actuating pressure for a first clutch and a second actuating pressure for a second clutch from a first characteristic diagram and applying the first and second actuating pressures to first and second output shafts to transmit the first torque based on the first operating point;
   c) determining a first actual differential rotational speed between a rotational speed of the first output shaft and a rotational speed of a drive shaft and a second actual differential rotational speed between a rotational speed of the second output shaft and the rotational speed of the drive shaft;
   d) one of: (1) adjusting a first calibrated actuating pressure for the first clutch until reaching a first target differential rotational speed and adjusting a second calibrated actuating pressure for the second clutch until reaching a second target differential rotational speed,
   or (2) adjusting a first calibrated torque at the drive unit until achieving a first target differential rotational speed on the first clutch and a second target differential rotational speed on the second clutch and
   e) generating a second characteristic diagram based on the calibrated actuating pressures or the first calibrated torque at the drive unit, wherein either the higher value of the actuating pressures is at first changed or both actuating pressures are changed at the same time in a weighting based on their value.

11. The method of claim 10, further comprising:
   identifying a deviation between a total target torque transmitted jointly by the first and second clutches and a transmissible total torque;
   adjusting the calibrated actuating pressures or the calibrated first torque on the drive axle to correct the deviation; and
   generating a second characteristic diagram based on the deviation.

12. The method of claim 10, further comprising carrying out step e) each time steps a) to d) are carried out.

13. The method of claim 10, wherein steps a) to e) are carried out at predetermined periods of time.

14. The method of claim 13, wherein the predetermined periods of time are determined based on at least one of the following parameters: a current time, an operating duration of a drive system, or a strain on the drive system.

* * * * *